United States Patent
Chilton et al.

(10) Patent No.: US 8,111,811 B2
(45) Date of Patent: Feb. 7, 2012

(54) METHODS, DEVICES AND COMPUTER PROGRAM PRODUCTS FOR PROVIDING CUSTOMER SERVICE CALL DIRECTION BASED UPON REMOTE DIAGNOSTICS

(75) Inventors: James Chilton, Roswell, GA (US); Samuel Zellner, Dunwoody, GA (US); Robert Starr, Decatur, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1332 days.

(21) Appl. No.: 11/584,864

(22) Filed: Oct. 23, 2006

(65) Prior Publication Data

US 2008/0095325 A1    Apr. 24, 2008

(51) Int. Cl.
*H04M 1/24* (2006.01)
*H04M 3/08* (2006.01)
*H04M 3/22* (2006.01)

(52) U.S. Cl. .............. 379/9.04; 379/26.02; 379/265.12

(58) Field of Classification Search .... 379/9, 9.02–9.04, 379/15.01, 15.03, 265.01, 265.05, 265.09, 379/265.11, 265.12, 266.1
See application file for complete search history.

(56) References Cited

U.S. PATENT DOCUMENTS

| | | | |
|---|---|---|---|
| 5,594,791 A | 1/1997 | Szlam et al. | |
| 5,768,261 A | 6/1998 | Brownmiller et al. | |
| 5,870,383 A | 2/1999 | Eslambolchi et al. | |
| 5,895,466 A | 4/1999 | Goldberg et al. | |
| 5,956,024 A | 9/1999 | Strickland et al. | |
| 5,963,635 A | 10/1999 | Szlam et al. | |
| 6,142,371 A | 11/2000 | Oneda | |
| 6,519,628 B1 | 2/2003 | Locascio | |
| 6,694,234 B2 | 2/2004 | Lockwood et al. | |
| 6,778,659 B2 | 8/2004 | Andersen | |
| 6,850,613 B2 | 2/2005 | McPartlan | |
| 6,882,718 B1 | 4/2005 | Smith | |
| 6,900,738 B2 | 5/2005 | Crichlow | |
| 6,957,257 B1 | 10/2005 | Buffalo et al. | |
| 7,003,085 B1 | 2/2006 | Lashley et al. | |
| 7,760,857 B2 * | 7/2010 | Vetter et al. | 379/9.03 |
| 2003/0135592 A1 * | 7/2003 | Vetter et al. | 709/220 |
| 2004/0176964 A1 * | 9/2004 | Ghaffar et al. | 705/1 |
| 2007/0133780 A1 * | 6/2007 | Berner et al. | 379/265.01 |
| 2008/0040452 A1 * | 2/2008 | Rao et al. | 709/219 |

* cited by examiner

*Primary Examiner* — Quoc D Tran (74) *Attorney, Agent, or Firm* — Cantor Colburn LLP (57) ABSTRACT

Directing customer service calls based upon remote diagnosis of customer premises equipment (CPE). CPE information is received remotely from the CPE. Network status information is received from a communications network indicative of a current operational status for the network. An issue is detected with the CPE based upon the received CPE information. A recommended customer service center is selected from a plurality of customer service centers based upon at least one of the CPE information and the network status information.

23 Claims, 7 Drawing Sheets

FIG. 1

| CPE ID FIELD 301 | OPERATING SYSTEM VERSION FIELD 303 | GUID FIELD 305 | PHONE NUMBER FIELD 307 | USER NAME FIELD 309 |
|---|---|---|---|---|
| 030242525 | 2.2.0a | 123.4.5.89 | 686-779-8187 | MSMGRT |
| 51235 | 4.5 | 545.3.5.66 | 630-557-8784 | DON HALLORAN |
| 4545-6373-757 | 1 | 330.72.46.44 | 414-757-0232 | BILL2003 |
| 01012-32345 | 5.2g | 441.45.87.54 | 715-362-4947 | 21 STEVENS ST |
| ZROD-BY1 | 3.5 | 141.646.88.1 | 312-364-0536 | 13522 |

*FIG. 2*

| TIME OF EVENT DETECTION FIELD 401 | EVENT DESCRIPTION FIELD 403 | TIME OF EVENT RESOLUTION FIELD 405 | GEOGRAPHIC IDENTIFIER FIELD 407 |
|---|---|---|---|
| 04/04/06 21:21:45 | 0014 | 0 | CLEVELAND OH |
| 04/07/06 15:34:11 | 0037 | 04/08/06 12:01:33 | 40:12:05N 74:36:43W |
| 04/11/06 14:32:52 | AAC | 0 | X=3300 Y=2470 |
| 04/04/06 21:21:45 | 0014 | 04/12/06 10:21:02 | CLEVELAND OH |
| 04/15/06 11:41:32 | E23 | 0 | 141.646.88.1 |

*FIG. 3*

| ELEMENT IDENTIFIER FIELD 501 | TIMESTAMP FIELD 503 | ACTIVATION/DEACTIVATION FIELD 505 |
|---|---|---|
| WIN-2000 | 05:55:57 | ACTIVATED |
| ACROBAT7 | 07:45:03 | ACTIVATED |
| SONY-PROJ-TV | 08:43:34 | ACTIVATED |
| SONY-PROJ-TV | 09:47:57 | DEACTIVATED |
| ACROBAT7 | 10:10:09 | DEACTIVATED |

*FIG. 4*

| CUSTOMER IDENTIFIER FIELD 601 | CPE ITEM IDENTIFIER FIELD 602 | TIMESTAMP FIELD 603 | TROUBLE CODE PARAMETERS OR KEY WORDS 605 |
|---|---|---|---|
| BILL012 | TELEPHONIC DEVICE | 7:55:58 | NO DIAL TONE |
| 47 MAPLE ST, 01745 | ACROBAT7 | 17:45:03 | CANNOT SAVE FILES |
| SAM PELOZZI | SONY-PROJ-TV | 09:43:38 | NO PICTURE |
| 545-154-4546 | PHOTOSHOP | 11:47:22 | CANNOT OPEN FILES |
| MADGE | WORD-2000 | 23:10:07 | CORRUPT DOCUMENT |

*FIG. 5*

| CUSTOMER SERVICE CENTER IDENTIFIER FIELD 701 | TROUBLE CODE PARAMETERS OR KEY WORDS 705 |
|---|---|
| FIRST CUSTOMER SERVICE CENTER | NO DIAL TONE |
| SECOND CUSTOMER SERVICE CENTER | MICROSOFT PROGRAMS |
| TRENTON-001 | TELEVISION SETS |
| CHICAGO-050 | INTERNET ACCESS |
| MADISON-2000 | CORRUPT DOCUMENTS |

FIG. 7C ated to the second business enterprise. At the same time, users become frustrated after speaking with one representative after another. Directing a call to an inappropriate customer service center is inefficient, time consuming, and costly, resulting in unnecessary inconvenience for the user as well as the service provider.

METHODS, DEVICES AND COMPUTER PROGRAM PRODUCTS FOR PROVIDING CUSTOMER SERVICE CALL DIRECTION BASED UPON REMOTE DIAGNOSTICS

BACKGROUND

The present disclosure relates generally to customer premises equipment, and more particularly, to methods, devices, and computer program products for supporting customer premises equipment situated at one or more remote locations.

Currently, communication services such as internet protocol television (IPTV), broadband Internet access, telephone service, satellite television, wireless communication, and cable television are provided to users through customer premises equipment. Examples of customer premises equipment include set top boxes (STBs), desktop computers, laptop computers, telephones, wireless devices, personal digital assistants, televisions, display screens, and media presentation devices. From time to time, a user may experience problems when accessing a communication service from customer premises equipment. These difficulties may be attributable to malfunctioning customer premises equipment, equipment that is not properly connected, a failure at the service provider, a communications network outage, various combinations thereof, and other factors not specifically enumerated.

If the user is unable to overcome a problem in accessing a communication service, he or she may call a representative at a customer service center to seek assistance. Oftentimes an inappropriate customer service center is contacted, whereupon the representative is unable to resolve the problem, necessitating a call to another customer service center. For example, a user may believe that he or she is experiencing a problem with malfunctioning hardware, so a call is placed to a service provider's hardware support center. After the user describes the problem to a customer service representative, the representative may determine that the problem is caused by corrupted software, and the call is transferred to a representative at the provider's software support center. Alternatively, the user may contact a representative at the service provider, though the problem is actually caused by a malfunctioning endpoint device purchased from a vendor having no relationship with the service provider.

More recently, a number of customer endpoint devices have been equipped with self-diagnostic software for categorizing problems by setting one or more designated numerical or alphanumeric trouble codes and directing customer service calls to a specified call center based upon the trouble code or codes that have been set. Although self-diagnostic endpoint devices represent an attempt to eliminate customer calls to inappropriate call centers, as a practical matter, these devices can be quite problematic. Oftentimes, problems are incorrectly categorized or telephone number information is outdated, resulting in calls to inappropriate customer service centers.

Directing customer service calls to inappropriate service centers is a serious problem. In a typical customer support scenario, as many as 40% of the calls placed by customers seeking assistance may be directed to an inappropriate service center. One practical consequence of call misdirection is that a steady stream of calls may be directed to a first business enterprise when, in fact, the problem is caused by hardware or software supported by a second business enterprise. Accordingly, the first business enterprise must staff its service centers with a sufficient number of personnel for diagnosing customer problems and also for dealing with a multiplicity of misdirected calls. The first business enterprise is called upon to bear the significant expense of servicing large numbers of customers whereas these costs should, in all fairness, be allocated to the second business enterprise. At the same time, users become frustrated after speaking with one representative after another. Directing a call to an inappropriate customer service center is inefficient, time consuming, and costly, resulting in unnecessary inconvenience for the user as well as the service provider.

There is a need in the art for improved methods and devices to facilitate customer service call direction for diagnosis and resolution of problems arising when a customer attempts to access a communication service from customer premises equipment.

SUMMARY

Embodiments include methods for directing customer service calls based upon remote diagnosis of customer premises equipment (CPE). The methods include receiving CPE information remotely from the CPE. Network status information is received from a communications network indicative of a current operational status for the network. An issue is detected with the CPE based on the received CPE information. A recommended customer service center is selected from a plurality of customer service centers based upon at least one of the CPE information and the network status information.

Embodiments further include computer program products for implementing the foregoing methods.

Additional embodiments include a device for directing customer service calls based upon remote diagnosis of customer premises equipment (CPE). The device includes a computing mechanism operatively coupled to a communications mechanism. The communications mechanism is capable of receiving CPE information remotely from the CPE. The communications mechanism is also capable of receiving network status information from a communications network indicative of a current operational status for the network. The computing mechanism detects an issue with the CPE based on the received CPE information, and formulates a recommendation identifying a recommended customer service center selected from a plurality of customer service centers based upon at least one of the CPE information and the network status information.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF DRAWINGS

Referring now to the drawings wherein like elements are numbered alike in the several FIGURES.

The detailed description explains exemplary embodiments of the invention, together with advantages and features, by way of example with reference to the drawings.

DETAILED DESCRIPTION OF EXEMPLARY EMBODIMENTS

Figure 1:
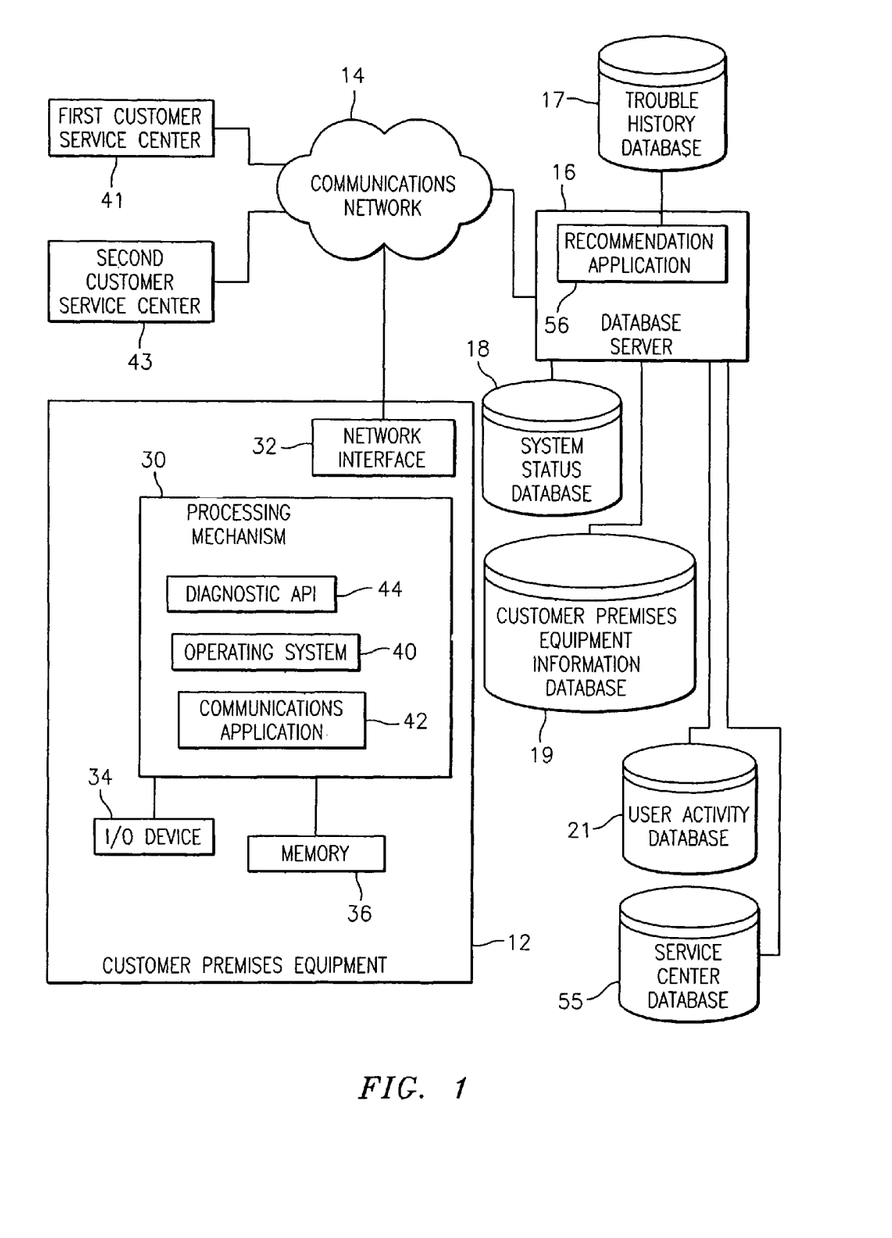
FIG. 1 shows an illustrative operational environment in which customer service call direction is performed based upon remote diagnosis of customer premises equipment.

FIG. 1 depicts a system for providing customer premises equipment diagnostic services in exemplary embodiments. The system includes at least one item of customer premises equipment (CPE) 12, such as a personal computer, laptop computer, personal digital assistant, wireless device, voice over internet protocol (VoIP) equipment, telephonic device, internet protocol television (IPTV) equipment, media presentation device, television, set-top box, or various combinations thereof. CPE 12 receives any of various communication services, such as broadcast video, broadcast audio, video on demand, Internet access, telephonic service, wireless access, or the like from communications network 14.

Communications network 14 may be implemented using any of a variety of networks and network components including, but not limited to, routers, switches, servers, the public switched telephone network (PSTN), the Internet, a cable television network, a wireless network, a satellite communications network or the like, as well as various combinations thereof. These networks and network components are equipped to communicate using one or more protocols which, for purposes of illustration, could but need not include digital subscriber line (DSL), Internet protocol (IP), WiFi (IEEE 802.11), or WiMax (IEEE 802.16). For example, one illustrative implementation for network 14 may include the PSTN providing broadband services over a DSL connection to CPE 12. These broadband services could, but need not, include IPTV service over a software platform such as the Microsoft TV IPTV Edition, running on network elements in network 14.

Database server 16 may be implemented using servers or general purpose computers capable of executing computer programs that perform the processes described herein. Database server 16 is capable of communicating with CPE 12 over network 14, and is also capable of accessing one or more databases. Illustratively, the databases accessed by database server 16 are provided in the form of a trouble history database 17, a system status database 18, a customer premises equipment information database 19, a user activity database 21, and a service center database 55.

Figure 2:
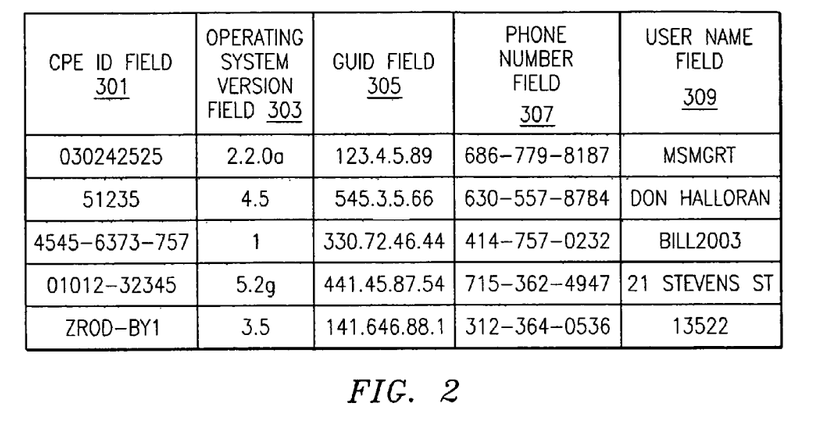
FIG. 2 depicts illustrative contents for a customer premises equipment information database which may be employed to implement the methods of FIGS. 7A-7C.

FIG. 2 illustrates exemplary content for customer premises equipment information database 19 (FIG. 1). Customer premises equipment information database 19 is employed to store CPE information received from CPE 12. CPE information includes data identifying one or more devices included in CPE 12. Optionally, CPE information also includes hardware configuration information for these devices, the geographic location of CPE 12, and a current operational status for one or more of these devices. In the example of FIG. 2, CPE information includes records having a plurality of data fields for each CPE, wherein the data fields include data received from diagnostic API 44 (FIG. 1). CPE identification data is set forth in a CPE ID field 301 (FIG. 2) in the form of one or more serial numbers for devices included in the CPE. An operating system version field 303 sets forth an operating system 40 (FIG. 1) version for software used by the device identified in CPE ID field 301 (FIG. 2), a globally unique identifier (GUID) field 305 sets forth a GUID for the device, a phone number field 307 sets forth a phone number associated with a user of the CPE, and a user name field 309 includes a user name assigned to or selected by the CPE user. The data fields depicted in FIG. 2 are shown for purposes of illustration, it being understood that other data fields not shown may be included, and/or some or all of the displayed data fields may not be utilized in specific system applications.

CPE information may optionally include operational data for CPE 12 (FIG. 1) which relates to the operational status of one or more devices included in the CPE. For example, if CPE 12 includes a television set operatively coupled to a set-top box (STB), then operational data may include an identifier setting forth the current channel the STB is tuned to, a current menu that the STB is accessing, and whether content is currently being stored to memory 36. Optionally, CPE information may include an address setting forth the physical location of the CPE user, coordinates setting forth the geographic location of the CPE user, additional CPE 12 software data such a version number for a boot read only memory (ROM) employed by CPE 12, and/or one or more version numbers or software program identifiers for communications application 40.

CPE information may optionally include communication parameters such as basic DSL-related diagnostic information, sync rate, port statistics, an IP address assigned to a DSL modem router included in CPE 12, a static IP address associated with CPE 12, etc. Other CPE information illustratively includes resource data such as available physical memory, available virtual memory, allocated physical memory, allocated managed memory, whether a hard drive is present (e.g., DVR), total hard disk space, dynamic host configuration protocol (DHCP) lease time remaining, default gateway, media access control (MAC) address, video type, etc., for CPE 12.

Figure 3:
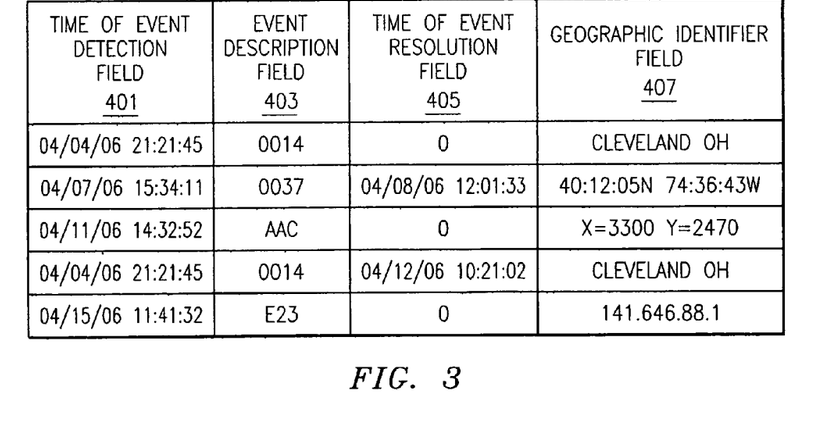
FIG. 3 depicts illustrative contents for a system status database which may be employed to implement the methods of FIGS. 7A-7C.

FIG. 3 illustrates exemplary content for system status database 18 (FIG. 1). Database server 16 collects information concerning the current operational status of communications network 14 and stores this information in system status database 18. The current operational status of communications network 14 may specify, for example, whether or not there are any current equipment outages, broken communication pathways, capacity issues, or other problems with communications network 14. In the example of FIG. 3, operational status information is organized in the form of an event list associating each of a plurality of event times in a time of event detection field 401 with a corresponding failure event descriptor in an event description field 403, a corresponding time of event resolution in a time of event resolution field 405, and a corresponding geographic identifier in a geographic identifier field 407. Event times in time of event detection field 401 may indicate a time at which a failure event was first observed or detected. Event times in time of event resolution field 405 may indicate a time at which the failure event was resolved or corrected, with a value of zero (0) indicating that the event has not yet been resolved.

Event descriptors in event description field 403 are alphabetic, alphanumeric or numeric codes assigned to each of a plurality of failure categories, such as server outages, broken communication pathways, or the like. Geographic identifier field 407 sets forth one or more locations for the failure event, illustratively in the form of a geographic description, X-Y coordinates, latitude and longitude, an IP address, or the like. These failures could, but need not, occur within communications network 14 (FIG. 1). For example, one illustrative failure event included in FIG. 3 is a server outage, wherein server outages are assigned an event descriptor code of 0014, and the location of the outage is in Cleveland, Ohio. The data fields depicted in FIG. 3 are shown for purposes of illustration, it being understood that other data fields not shown may be included, and/or some or all of the displayed data fields may not be utilized in specific system applications.

Figure 4:
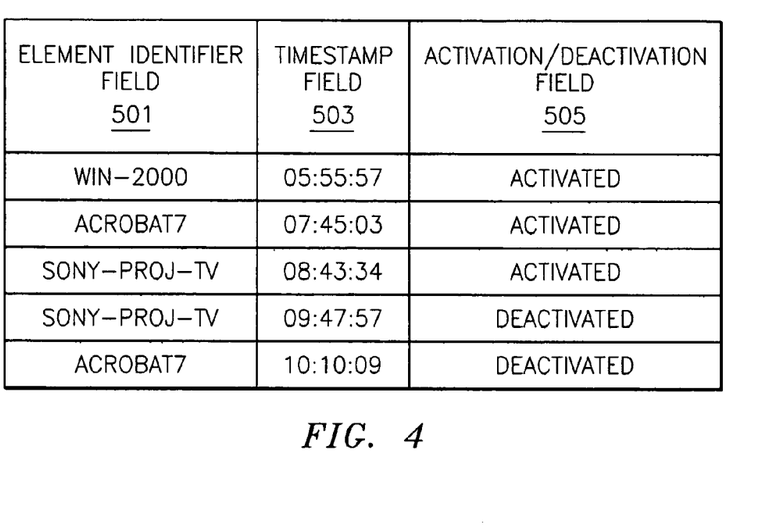
FIG. 4 depicts illustrative contents for a user activity database which may be employed to implement the methods of FIGS. 7A-7C.

FIG. 4 illustrates exemplary content for user activity database 21 (FIG. 1). Database server 16 receives information regarding usage of CPE 12, such as the time one or more elements in CPE 12 were used, and the identities of these elements. Elements may be hardware (equipment), programs (software), or various combinations thereof. Database server 16 stores this information in user activity database 21, illustratively as shown in FIG. 4, by associating a CPE element identifier in element identifier field 501 (FIG. 4) with a corresponding timestamp in timestamp field 503 and a corresponding use flag in activation/deactivation field 505. The CPE element identifier identifies a particular item of hardware (equipment) or program (software) contained within CPE 12. The exemplary identifiers shown in FIG. 4, such as "WIN-2000" and "ACRO7", are employed to refer, respectively, to a Windows 2000 operating system and Adobe Acrobat software resident on CPE 12. The CPE element identifier "SONY-PROJ-TV" refers to a Sony projection television set included within CPE 12. Of course, any preassigned numeric, alphanumeric, or alphabetic codes may be employed for these CPE element identifiers.

The use flag in activation/deactivation field 505 specifies whether or not an element identifier specified in element identifier field 501 has been activated or deactivated at the time indicated in timestamp field 503. The data fields depicted in FIG. 4 are shown for purposes of illustration, it being understood that other data fields not shown may be included, and/or some or all of the displayed data fields may not be utilized in specific system applications.

Figure 5:
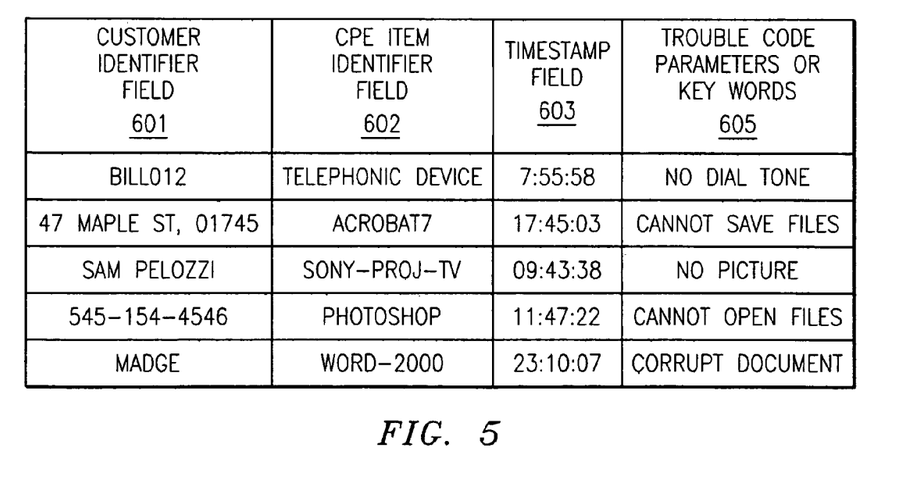
FIG. 5 depicts illustrative contents for a trouble history database which may be employed to implement the methods of FIGS. 7A-7C.

FIG. 5 illustrates exemplary content for trouble history database 17 (FIG. 1). If a customer has a problem accessing or using a service over communications network 14, database server 16 generates a record of the problem in the form of a trouble event record and stores the record in trouble history database 17. Each trouble event record associates a customer identifier in customer identifier field 601 (FIG. 5) with a corresponding CPE item identifier in CPE item identifier field 602, a corresponding timestamp in timestamp field 603, and corresponding trouble code parameters or key words 605. A customer identifier is any numeric, alphanumeric or alphabetic indicia that serves to uniquely identify each of a plurality of customers. A CPE item identifier is any numeric, alphanumeric or alphabetic indicia that serves to uniquely identify each of a plurality of CPE 12 devices. A timestamp provides an indication of a time at which the trouble event has occurred. Trouble code parameters or key words 605 are illustratively provided in the form of numeric, alphabetic, or alphanumeric codes assigned to each of a plurality of issue categories, such as difficulties connecting to communications network 14, inability to receive streamed video on a customer endpoint device, failure to complete a VoIP call, and others. Alternatively or additionally, trouble code parameters or key words 605 may be provided in the form of one or more key words that are descriptive of a given communication service issue or category of communication service issues. The data fields depicted in FIG. 5 are shown for purposes of illustration, it being understood that other data fields not shown may be included, and/or some or all of the displayed data fields may not be utilized in specific system applications.

Figure 6:
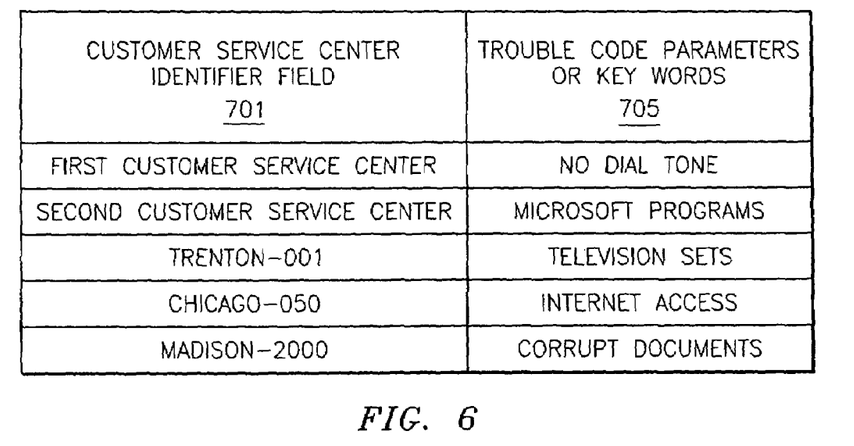
FIG. 6 depicts illustrative contents for a service center database which may be employed to implement the methods of FIGS. 7A-7C.

FIG. 6 illustrates exemplary content for service center database 55. Service center database 55 associates each of a plurality of service center identifiers in customer service center identifier field 701 with one or more corresponding trouble code parameters or key words 705 indicative of an issue or issue category related to accessing and/or using a communication service. Customer service identifiers uniquely identify a specific customer service center, such as first customer service center 41 (FIG. 1) and second customer service center 43. Association of a customer service center identifier with one or more trouble code parameters or key words 705 signifies that this customer service center has expertise in resolving communication service issues related to the identified trouble code parameters or key words, or that this customer service center is capable of facilitating resolution of communication service issues related to the identified trouble code parameters or key words. The data fields depicted in FIG. 6 are shown for purposes of illustration, it being understood that other data fields not shown may be included, and/or some or all of the displayed data fields may not be utilized in specific system applications.

Trouble history database 17 (FIG. 1), system status database 18, customer premises equipment information database 19, user activity database 21, and service center database 55 may each be implemented using devices that are separate from database server 16 as shown in FIG. 1. Additionally or alternatively, one or more of these databases 17, 18, 19, 21, 55 may be implemented in the form of memory within database server 16, or one or more of these databases 17, 18, 19, 21, 55 may be integrated into a single data storage drive.

Referring back to FIG. 1, according to an exemplary embodiment, CPE 12 includes a processing mechanism 30, a network interface 32, an input/output (I/O) device 34 and memory 36. I/O device 34 is implemented using any mechanism that permits a user to interact with customer premises equipment 12. For example, I/O device 34 may comprise an infrared receiver that receives commands from a user's remote control. Alternatively or additionally, I/O device 34 may be implemented using technologies including, but not limited to, touch screens, voice recognition, wired/wireless peripherals (keyboard, mouse, joystick, trackball), a keypad on a personal digital assistant (PDA), a keypad on a wireless phone, etc. Further, I/O device 34 may communicate directly with other, non-human devices such as servers and/or computers for configuring CPE 12.

Network interface 32 provides a communication interface with network 14. Network interface 32 may be implemented using existing communication devices such as a DSL modem, cable modem, etc. Processing mechanism 30 may be a general-purpose microprocessor executing a computer program for executing the processes described herein. Processing mechanism 30 may access memory (e.g., RAM) containing a computer program for execution.

Memory 36 is used for storing a variety of information. Memory 36 may store information pertaining to customer premises equipment 12, illustratively including one or more of a serial or identification (ID) number, an addressable ID comprising a globally unique identifier (GUID), configuration information, software information, or hardware information. Optionally, memory 36 is also utilized store media content, such as recorded broadcast television, recorded audio, or one or more Internet web pages, and may include memory that serves as a digital video recorder (DVR). Memory 36 may be implemented using a variety of non-volatile memory devices including, but not limited to, hard drives, flash memory, optical storage devices, solid state memory, etc., used alone or in combination.

Processing mechanism 30 executes software applications including an operating system 40, a communications application 42, and a diagnostic application program interface (API) 44. Operating system 40 provides the software environment for execution of the other programs. Illustrative examples of operating systems include any of various versions of Microsoft Windows, Microsoft CE, and others. Communications application 42 is responsible for processing information received over communications network 14 so as to provide for reception of a communication service such as IPTV, Internet access, broadcast television, video-on-demand (VOD), news, radio broadcasts, VoIP, telephonic communications, video conferencing, or the like.

Diagnostic API 44 collects operational status information for CPE 12 in real time and sends the diagnostic information over communications network 14 to database server 16 on a periodic, recurring, or predetermined basis. For example, diagnostic API 44 may send diagnostic information at predetermined intervals (e.g., every N minutes), or upon the detection of a change in operational status of CPE 12, or both. For example, a change in operational status may include upgrading operating system 40, or detecting a new hardware device added to CPE 12. As described in further detail herein, database server 16 receives diagnostic information from diagnostic API 44 and stores this information in customer premises equipment information database 19.

Database server 16 executes an operating system (e.g., Microsoft Windows, OS/2, or the like) that provides a software environment for executing other applications. A web browser may be employed to provide access to database server 16 over communications network 14. In this manner, database server 16 executes a web server application that permits access to trouble history database 17, system status database 18, customer premises equipment information database 19, user activity database 21, and service center database 55 via a web interface. This web application permits database server 16 to provide at least one of a first customer service center 41 and a second customer service center 43 with access to data retrieved from databases 17, 18, 19, 21, 55 over communications network 14. Optionally, database server 16 may organize data retrieved from databases 17, 18, 19, 21, 55 in the form of a template, so as to facilitate data search inquiries received from first and second customer service centers 41, 43. Such a template serves as a tool for retrieving data from databases 17, 18, 19, 21, 55 in an orderly format, easily presented to a customer service representative at first customer service center 41 or second customer service center 43.

A recommendation application 56 is provided for recommending a customer service center selected from a plurality of customer service centers. The recommended service center is selected so as to permit direction of a customer call to a service center capable of facilitating a resolution of a communication service issue experienced by a user of CPE 12. More specifically, recommendation application 56 processes data from one or more databases 17, 18, 19, 21 or 55, and uses the processed data to formulate a recommendation for directing a call to a recommended customer service center selected from a plurality of customer service centers. Recommendation application selects the recommended customer service center from service center database 55.

FIG. 1 shows recommendation application 56 residing on database server 16. However, it is to be understood that this shown is for illustrative purposes only, as all or a portion of recommendation application 56 could, but need not, reside on customer premises equipment 12. Recommendation application 56 formulates a customer service center recommendation by determining which of a plurality of customer service centers set forth in service center database 55 is capable of facilitating resolution of a given communication service issue, or by determining which of a plurality of customer service centers is most likely to facilitate a resolution of the issue, or both. This determination is made using data retrieved from one or more databases 17, 18, 19, 21. For example, resolution of the issue may be facilitated by comparing one or more trouble code parameters or key words 605 (FIG. 5) for a given CPE 12 (FIG. 1) stored in trouble history database 17 (FIG. 1) with one or more trouble code parameters or key words 705 stored in service center database 55 to identify any matching trouble code parameters or key words. A customer service center is recommended by selecting a center having at least one trouble code parameter or key word associated therewith which matches at least one trouble code parameter or key word associated with the given CPE. Alternatively or additionally, a customer service center is recommended by selecting a center having a maximum number of trouble code parameters or key words associated therewith matching a maximum number of trouble code parameters or key words associated with the given CPE.

Figure 7A:
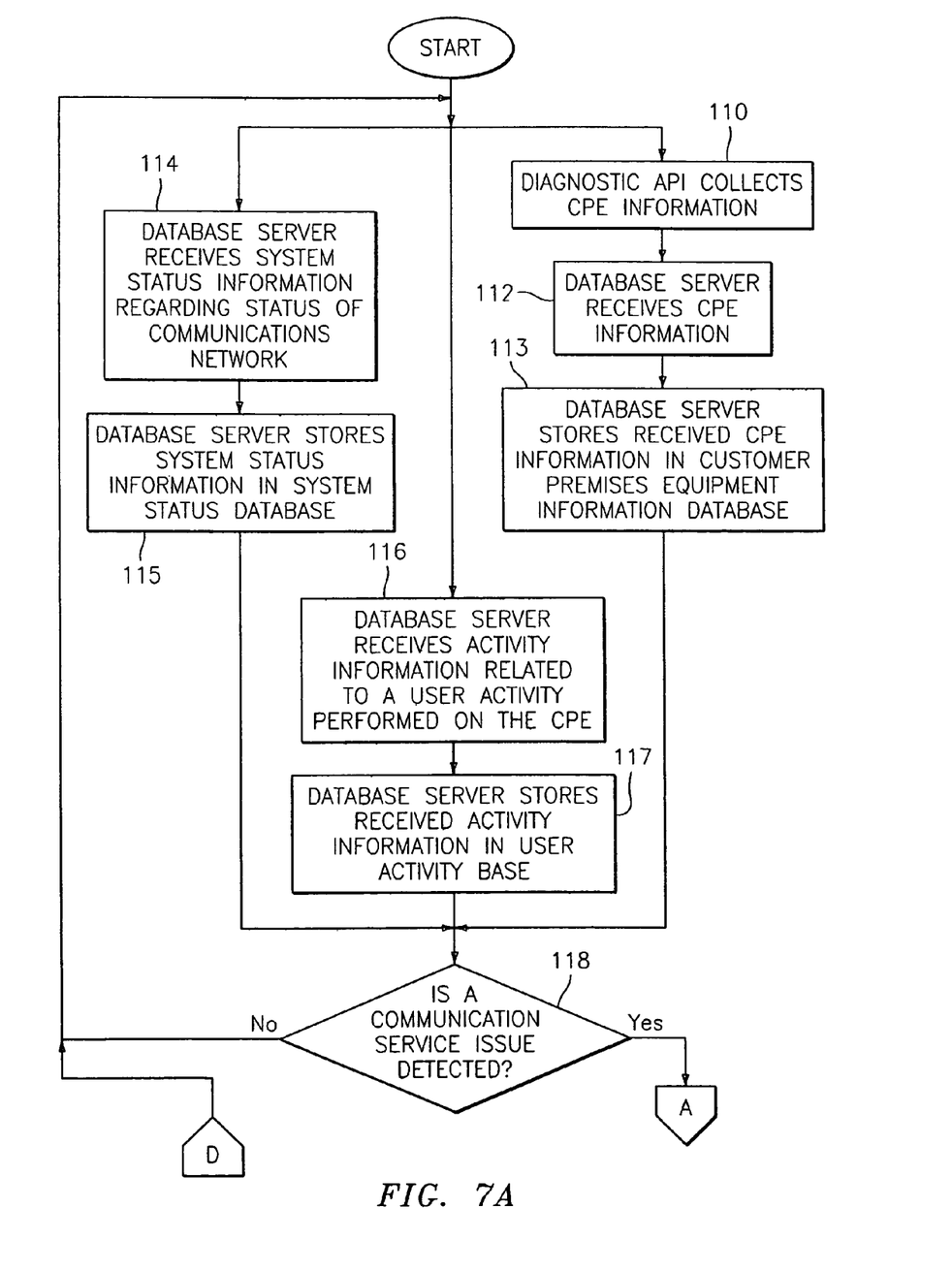
FIGS. 7A-7C set forth methods for providing customer service call direction based upon remote diagnosis of customer premises equipment according to various exemplary embodiments disclosed herein.
Figure 7B:
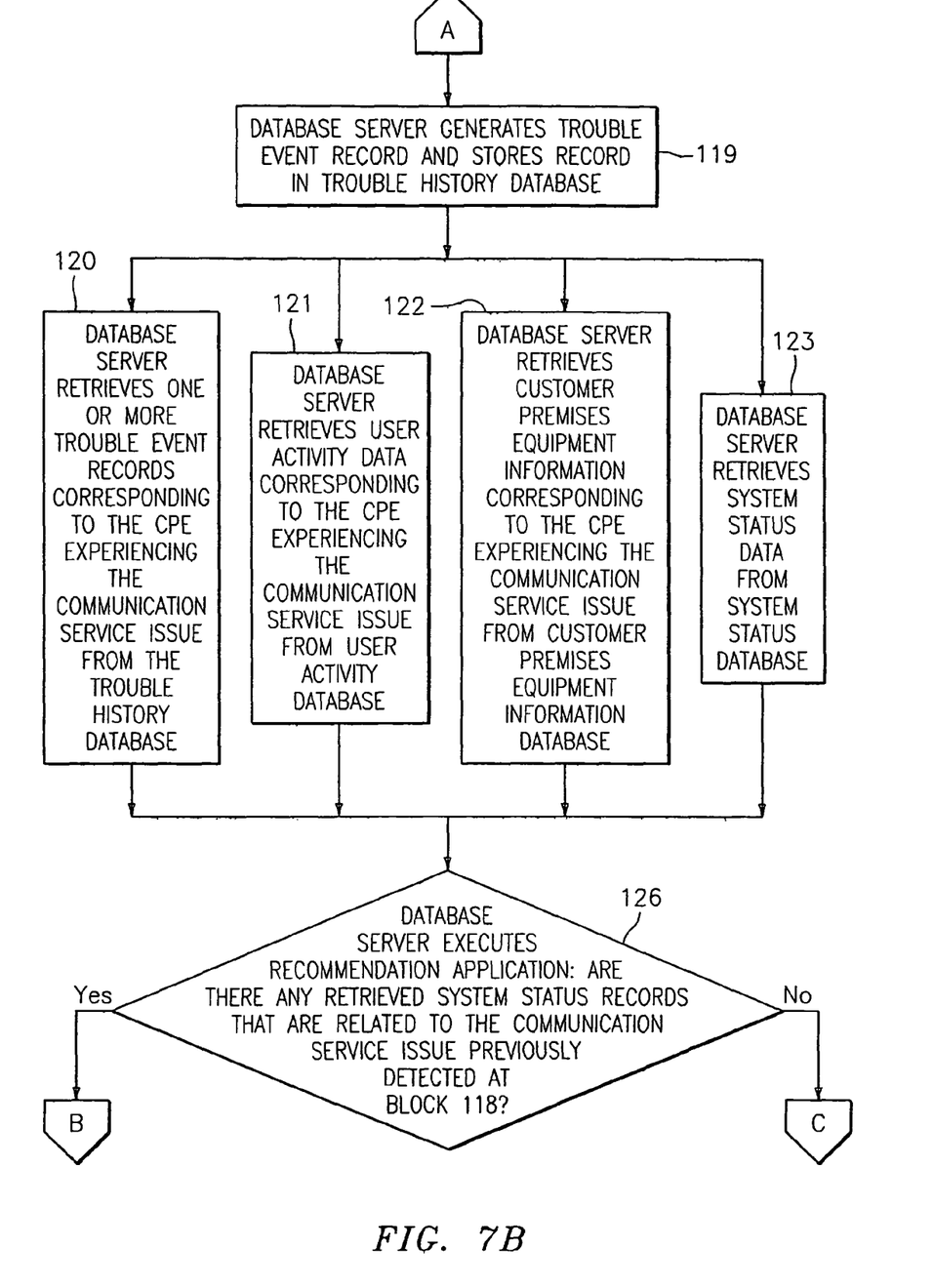
Figure 7C:
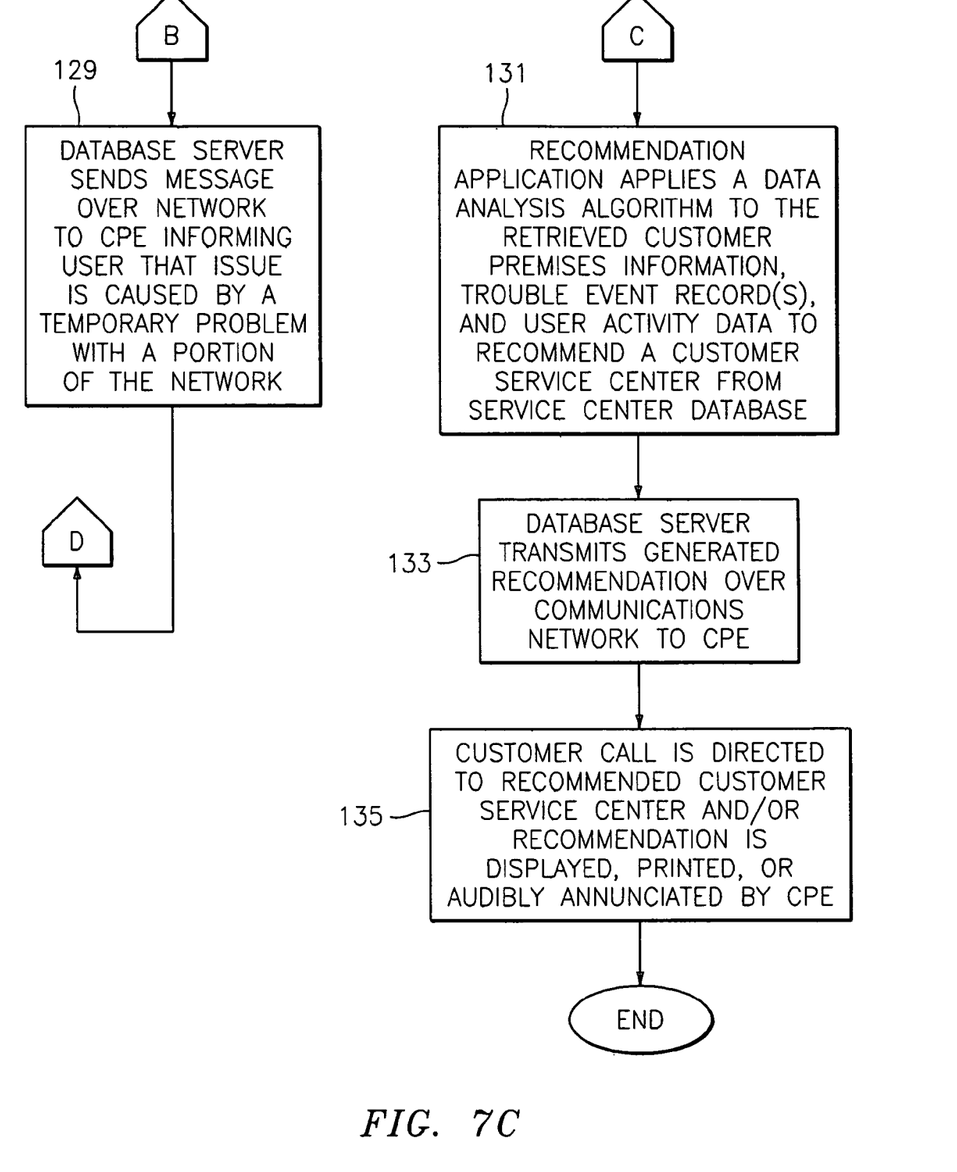

FIGS. 7A-7C together comprise a flow chart of a procedure for directing customer service calls based upon remote diagnostics according to various exemplary embodiments disclosed herein. In general, a recommendation application 56 (FIG. 1) is executed to address communication service issues affecting CPE 12. Recommendation application 56 accesses data in one or more databases 17, 18, 19, 21, or 55 to categorize these issues. Based upon the categorization, recommendation application 56 generates a recommendation by selecting a customer service center from a plurality of customer service centers. Recommendation application 56 may be executed at database server 16, processing mechanism 30, or both. However, for explanatory purposes, the flowchart of FIGS. 7A-7C assumes that recommendation application 56 is executed at database server 16.

With reference to FIG. 7A, the operations of blocks 110-113, blocks 114-115, and blocks 116-117 may be performed simultaneously, contemporaneously, sequentially, in parallel, or in any order. According to an exemplary embodiment, at block 110, diagnostic API 44 (FIG. 1) collects CPE information. Information may be collected by API 44 in real time, at regular intervals, at scheduled times, and/or upon detection of a change in CPE information. Next, at block 112 (FIG. 7A), database server 16 (FIG. 1) receives the CPE information which was collected by the diagnostic API in the immediately preceding block. This CPE information is sent by CPE 12 over communications network 14 to database server 16. The CPE information collected by API 44 (FIG. 1) may be stored in memory 36 and periodically sent to database server 16 at regular intervals. Upon receipt of CPE information (FIG. 7A, block 112), the database server stores this information (block 113) in customer premises equipment information database 19 (FIG. 1).

Alternatively or additionally, CPE information may be sent to database server 16 in real time. For example, diagnostics API 44 may routinely (every N minutes) monitor information on CPE 12 and send the CPE information to database server 16. Alternatively, certain data may be sent once and then updated when a change is detected in CPE 12. For example, operating system 40 of CPE 12 is not expected to change frequently. Thus, diagnostic API 44 can be programmed to forward information regarding operating system 40 to database server 16 initially, and then not send additional operating system information until an update in the operating is detected by diagnostic API 44. This reduces the amount of information sent to database server 16. Other CPE information, such as the number of a television channel currently being viewed or a menu function currently being accessed by the user, may be sent to database server 16 in real time, and/or sent to the database server in response to a function or feature on CPE 12 being activated, and/or sent to the database server at regular intervals. Thus, CPE information may include a combination of historic information and more current, e.g., real time, information to diagnose CPE issues such as problems accessing or using a communication service over network 14.

At block 114 (FIG. 7A), the database server receives system status information regarding the status of communications network 14 (FIG. 1) on a periodic, regular, recurring, or scheduled basis, or in response to an event that occurs on the communications network such as a device failure. System status information includes data related to any equipment failure, bandwidth limitation, malfunction, or outage on the communications network. Next, at block 115 (FIG. 7A), the database server stores this system status information in system status database 18 (FIG. 1).

At block 116 (FIG. 7A), the database server receives activity information related to a user activity performed on the CPE. Activity information is received on a periodic, regular, recurring, or scheduled basis, or in response to initiation of a user activity on the CPE. User activities include a user accessing, using, or attempting to access a communication service over the communications network, as well as a user operating or attempting to operate all or a portion of the CPE. The database server then stores the received activity information in user activity database 21 (FIG. 1).

At block 118 (FIG. 7A), a test is performed to ascertain whether or not a communication service issue has been detected. An issue may be detected in a number of ways. For example, I/O device 34 (FIG. 1) of CPE 12 may include a "help" key, pushbutton or icon by which a user of the CPE may initiate reporting of a communication services issue. The issue could, by way of example, involve problems with viewing and recording a television program, such that the television program periodically appears pixellated for no apparent reason. Alternatively or additionally, recommendation application 56 may run a diagnostic analysis routine on data in customer status database 19 to detect trends that indicate an issue is present or likely. For example, the recommendation application 56 may examine data in customer status database 19 to detect any STB in CPE 12 having a hard drive that is almost completely full. Such a condition can negatively effect operation of the STB. Thus, these STBs, and/or the CPE 12 including these STBs, would be flagged as having an issue by recommendation application 56. Pursuant to an exemplary embodiment, the negative branch from block 118 (FIG. 7A) leads back to blocks 110, 114, and 116 (described previously) where receipt of CPE information, activity information, and system status information by the data server continues until an issue is detected.

If an issue is detected at block 118, program flow proceeds to block 119 (FIG. 7B) where a trouble event record is generated by the database server and stored in trouble history database 17 (FIG. 1). As previously discussed in connection with FIG. 5, the trouble event record associates a customer identifier and a CPE item identifier with trouble code parameters or key words 605 (FIG. 5) indicative of the issue detected at block 118 (FIG. 7B) and a timestamp indicative of a time at which the issue was detected.

Next, the operations of blocks 120, 121, 122, and 123 are performed simultaneously, contemporaneously, sequentially, in parallel, or in any order. At block 120, the database server retrieves one or more trouble event records corresponding to the CPE experiencing the communication service issue from the trouble history database. The database server retrieves user activity data corresponding to the CPE experiencing the communication service issue from the user activity database (block 121). The database server retrieves CPE information corresponding to the CPE experiencing the communication service issue from the customer premises equipment information database (block 122). The database server retrieves system status data from the system status database (block 123).

Program control progresses to block 126 where the database server 16 executes recommendation application 56 to determine whether or not any system status records retrieved from system status database 18 are related to the issue detected at block 118. For example, if a user is attempting to place a VoIP call over a broadband Internet connection, but system status records indicate that the telephone company central office serving the called party has been flooded, then the retrieved system status records are related to the issue detected at block 118.

If there are system status records related to the detected issue, program control advances to block 129 where database server 16 sends a message over network 14 to CPE 12 informing the user that the issue is caused by a temporary problem with a portion of network 14, and the program flow continues as shown in FIG. 7A. If recommendation application 56 determines that the retrieved system status records are not related to the detected issue, program control progresses to block 131 where the recommendation application applies a data analysis algorithm to the data retrieved at blocks 120-123 to formulate a recommendation. The recommendation is formulated by selecting a service center from service center database 55. Selection is performed by determining which of a plurality of customer service centers set forth in service center database 55 is capable of facilitating resolution of a given communication service issue, or by determining which of a plurality of customer service centers is most likely to facilitate a resolution of the issue, or both.

Pursuant to a set of exemplary embodiments, a recommendation is formulated by comparing one or more trouble code parameters or key words 605 (FIG. 5) for a given CPE 12 (FIG. 1) stored in trouble history database 17 (FIG. 1) with one or more trouble code parameters or key words 705 (FIG. 6) stored in service center database 55 (FIG. 1) to identify any matching trouble code parameters or key words. A customer service center is recommended by selecting a center having at least one trouble code parameter or key word associated therewith which matches at least one trouble code parameter or key word associated with the given CPE. Alternatively or additionally, a customer service center is recommended by selecting a center having a maximum number of trouble code parameters or key words associated therewith matching a maximum number of trouble code parameters or key words associated with the given CPE.

At block 133 (FIG. 7C), database server 16 (FIG. 1) transmits the generated recommendation over communications network 14 to CPE 12. Next (FIG. 7C, block 135), a call to a customer service center is directed in accordance with the recommendation generated by recommendation application 56 (FIG. 1). For example, processing mechanism of CPE 12 may be programmed to automatically route a call placed by a CPE user to the recommended customer service center. Alternatively or additionally, processing mechanism 30 may be programmed to cause contact information for the recommended customer service center to be displayed, annunciated in audible form, or printed by I/O device 34.

Upon contacting the recommended customer service center, the user may discuss the communication service issue with a representative so as to enable the representative to formulate an appropriate resolution. This discussion may occur in the form of a telephone conversation, live Internet chat, video conference, instant message, email exchange, text message exchange, or the like. For example, the customer service representative may evaluate the CPE information and suggest certain actions be taken by the user (e.g., alter system set-up), or may instruct the user to initiate corrective measures (e.g., initiate an update of CPE software).

Optionally, recommendation application 56 includes diagnostic tools to identify issues that may not be readily apparent to the representative. For example, recommendation application 56 may include instructions for recognizing outdated software versions on CPE 12, incorrect communication settings on the CPE, etc. There are many other conditions the application can test/detect such as provisioning of a set-top box (STB) based on a billing plan. Other conditions include detecting if throughput rates for video packets upstream and downstream are within threshold limits. Further, line noise and jitter may be detected. Thus, with the assistance of recommendation application 56, the customer service representative may accomplish more effective issue resolution without the distraction and inefficiency of handling misdirected requests for help. Moreover, CPE users will experience faster, more efficient, less frustrating resolutions to their communication services issues.

Optionally, recommendation application 56 may facilitate resolution of a communication service issue without having to formulate a customer service center recommendation. In some situations, it might be possible for recommendation application 56 to automatically formulate a solution to the communication service issue without the necessity of directing a call to a customer service center. Assume, for purposes of illustration, that recommendation application 56 automatically detects memory 36 of CPE 12 being almost completely full. Detection of this event is used to flag an issue (FIG. 7A, block 118). Recommendation application 56 (FIG. 1) may then resolve the issue by sending a message to CPE 12, the message instructing the user to delete contents from memory 36, such that the message is presented on a display device of CPE 12.

As described above, the present invention can be embodied in the form of computer-implemented processes and apparatuses for practicing those processes. The present invention can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for directing customer service calls based upon remote diagnosis of customer premises equipment, the method comprising:
   monitoring customer premises equipment and collecting customer premises equipment information remotely from the customer premises equipment, the customer premises equipment information including customer premises equipment operational data and user activity data conducted at the customer premises equipment, and the customer premises equipment information is received over the communications network from a diagnostic application program interface executing at the customer premises equipment;
   receiving network status information from a communications network indicative of a current operational status for the network;
   detecting an issue with the customer premises equipment responsive to the monitoring; and
   selecting a customer service center from a plurality of customer service centers based upon the customer premises equipment information and the network status information.

2. The method of claim 1, wherein selecting the customer service center includes comparing a trouble code associated with the issue with a database of trouble codes provided for the plurality of customer service centers, matching the trouble code associated with the issue with one of the trouble code provided in the database of trouble codes, and identifying a corresponding one of the plurality of customer service centers from the matching.

3. The method of claim 1, further including automatically directing a customer service call to the customer service center.

4. The method of claim 1, further including generating an output identifying the customer service center.

5. The method of claim 1 wherein the customer premises equipment information further includes customer premises equipment software data including a boot read only memory version, an operating system version, and an Internet Protocol television client version, and the customer premises equipment information further includes content currently stored in memory of the customer premises equipment.

6. The method of claim 1 wherein the customer premises equipment information further includes customer premises equipment identification data.

7. The method of claim 1 wherein the customer premises equipment operational data includes a currently tuned in customer premises equipment channel and a current customer premises equipment menu.

8. The method of claim 1 wherein the customer premises equipment information further includes customer premises equipment resource data including available physical memory, available virtual memory, allocated physical memory, allocated managed memory, hard drive presence, total hard disk space, dynamic host configuration protocol lease time remaining, default gateway, media access control address, and video type.

9. A computer program product for establishing a trusted network, the computer program product comprising:
   a non-transitory storage medium readable by a processing circuit and storing instructions for execution by the processing circuit for facilitating a method for directing customer service calls based upon remote diagnosis of customer premises equipment, the method comprising:
   monitoring customer premises equipment and collecting customer premises equipment information remotely from the customer premises equipment, the customer premises equipment information including customer premises equipment operational data and user activity data conducted at the customer premises equipment, and the customer premises equipment information is received over the communications network from a diagnostic application program interface executing at the customer premises equipment;
   receiving network status information from a communications network indicative of a current operational status for the network;
   detecting an issue with the customer premises equipment responsive to the monitoring; and
   selecting a customer service center from a plurality of customer service centers based upon the customer premises equipment information and the network status information.

10. The computer program product as recited in claim 9, wherein selecting the customer service center includes comparing a trouble code associated with the issue with a database of trouble codes provided for the plurality of customer service centers, matching the trouble code associated with the issue with one of the trouble code provided in the database of trouble codes, and identifying a corresponding one of the plurality of customer service centers from the matching.

11. The computer program product as recited in claim 9, further including instructions for automatically directing a customer service call to the customer service center.

12. The computer program product as recited in claim 9, further including instructions for generating an output identifying the customer service center.

13. The computer program product as recited in claim 9, wherein the customer premises equipment information further includes customer premises equipment software data including a boot read only memory version, operating system version, and Internet Protocol television client version, and the customer premises equipment information further includes content currently stored in memory of the customer premises equipment.

14. The computer program product as recited in claim 9 wherein the customer premises equipment information further includes customer premises equipment identification data.

15. The computer program product as recited in claim 9, wherein the customer premises equipment operational data includes a currently tuned in customer premises equipment channel and a current customer premises equipment menu.

16. The computer program product as recited in claim 9, wherein the customer premises equipment information further includes customer premises equipment resource data including available physical memory, available virtual memory, allocated physical memory, allocated managed memory, hard drive presence, total hard disk space, dynamic host configuration protocol lease time remaining, default gateway, media access control address, and video type.

17. A device for directing customer service calls based upon remote diagnosis of customer premises equipment, the device comprising:
   a communications mechanism configured for monitoring customer premises equipment and collecting customer premises equipment information remotely from the customer premises equipment, and also configured for receiving network status information from a communications network indicative of a current operational status for the network, the customer premises equipment information including customer premises equipment operational data and user activity data conducted at the customer premises equipment, and the customer premises equipment information is received over the communications network from a diagnostic application program interface executing at the customer premises equipment;
   a computing mechanism, operatively coupled to the communications mechanism, for detecting an issue with the customer premises equipment responsive to the monitoring, and for formulating a recommendation identifying a customer service center selected from a plurality of customer service centers based upon the customer premises equipment information and the network status information.

18. The device of claim 17, wherein formulating the recommendation of the customer service center includes comparing a trouble code associated with the issue with a database of trouble codes provided for the plurality of customer service centers, matching the trouble code associated with the issue with one of the trouble code provided in the database of trouble codes, and identifying a corresponding one of the plurality of customer service centers from the matching.

19. The device of claim 17 wherein the communications mechanism is configured to transmit the recommendation to the customer premises equipment, thereby causing a customer call to be directed to the customer service center.

20. The device of claim 17 wherein the customer premises equipment information further includes customer premises equipment software data including a boot read only memory version, an operating system version, and an Internet Protocol television client version, and the customer premises equipment information further includes content currently stored in memory of the customer premises equipment.

21. The device of claim 17 wherein the customer premises equipment information further includes customer premises equipment identification data.

22. The device of claim 17 wherein the customer premises equipment information further includes customer premises equipment operational data including a currently tuned in customer premises equipment channel and a current customer premises equipment menu.

23. The method of claim 17 wherein the customer premises equipment information further includes customer premises equipment resource data including available physical memory, available virtual memory, allocated physical memory, allocated managed memory, hard drive presence, total hard disk space, dynamic host configuration protocol lease time remaining, default gateway, media access control address; and video type.

* * * * *